United States Patent
Tsai et al.

(10) Patent No.: US 12,260,245 B2
(45) Date of Patent: Mar. 25, 2025

(54) METHOD FOR DEPLOYING REMOTE DESKTOP GATEWAYS, COMPUTER DEVICE, AND STORAGE MEDIUM

(71) Applicant: Fulian Precision Electronics (Tianjin) Co., LTD., Tianjin (CN)

(72) Inventors: Pei-Jung Tsai, New Taipei (TW); Cheng-Ta Hsu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 463 days.

(21) Appl. No.: 17/719,517

(22) Filed: Apr. 13, 2022

(65) Prior Publication Data
US 2022/0342692 A1    Oct. 27, 2022

(30) Foreign Application Priority Data

Apr. 23, 2021 (CN) .......................... 202110442640.8

(51) Int. Cl.
*G06F 9/455*    (2018.01)
*G06N 3/08*    (2023.01)

(52) U.S. Cl.
CPC .......... *G06F 9/45558* (2013.01); *G06N 3/08* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 2010/0027552 A1* | 2/2010 | Hill | H04L 67/51 370/401 |
| 2013/0275975 A1* | 10/2013 | Masuda | G06F 8/61 718/1 |
| 2013/0325934 A1* | 12/2013 | Fausak | H04L 69/162 709/203 |
| 2016/0048580 A1* | 2/2016 | Raman | G06Q 50/10 707/737 |
| 2017/0063908 A1 | 3/2017 | Muddu et al. | |
| 2019/0377625 A1* | 12/2019 | Chintalapati | G06N 7/01 |
| 2020/0044934 A1* | 2/2020 | Collison | H04L 41/0823 |
| 2021/0232473 A1* | 7/2021 | Laskawiec | G06F 9/5005 |

FOREIGN PATENT DOCUMENTS

| | | |
|---|---|---|
| CN | 102446121 A | 5/2012 |
| CN | 112148427 A | 12/2020 |

* cited by examiner

*Primary Examiner* — Lewis A Bullock, Jr.
*Assistant Examiner* — Jordan Scott Motter
(74) *Attorney, Agent, or Firm* — ScienBiziP, P.C.

(57) ABSTRACT

A method for deploying remote desktop gateways (RDGWs), a computer device, and a storage medium are provided. Application data of virtual machines (VMs) is obtained in RDGWs, the application data includes historical data and real-time data. A neural network is trained by using the historical data and a target classification model is obtained. The real-time data is inputted into the target classification model and a classification result of the real-time data is obtained. The VMs are deployed to a designated RDGW based on the classification result. The method allocates and deploys resources with greater efficiency.

20 Claims, 2 Drawing Sheets

METHOD FOR DEPLOYING REMOTE DESKTOP GATEWAYS, COMPUTER DEVICE, AND STORAGE MEDIUM

FIELD

The present application relates to a computer technical field, and more particularly to a method for deploying remote desktop gateways, a computer device, and a storage medium.

BACKGROUND

In virtualization, a problem of insufficient resources or excess resources of a remote desktop gateway usually occurs. It is important to ensure appropriate resources in the remote desktop gateway at any time to handle a current traffic demand, and immediately discover and solve the waste of resources of the remote desktop gateway.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
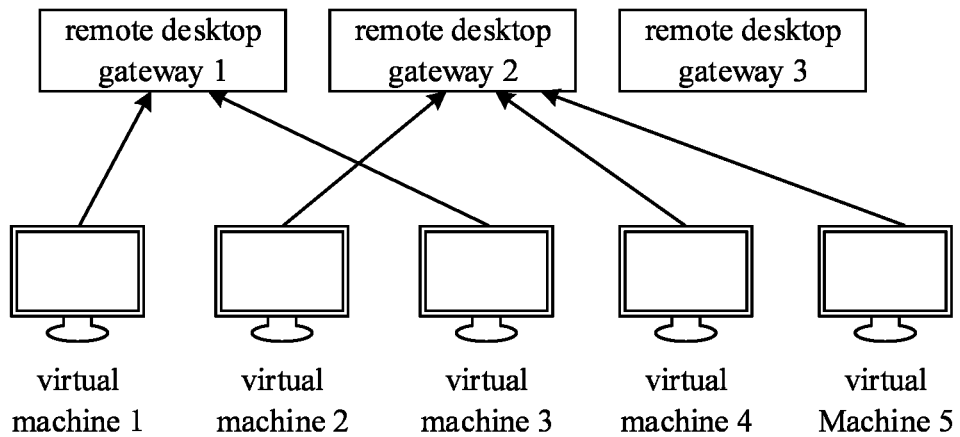
FIG. 1 is a block diagram of showing remote desktop gateways in connection with virtual machines in an embodiment of the present application.

FIG. 1 is a block diagram of showing remote desktop gateways in connection with virtual machines in an embodiment of the present application.

In FIG. 1, connection relationships between virtual machines (VMs) and remote desktop gateways (RDGWs) are shown. Detail descriptions will be described below with reference to the flowchart shown in FIG. 2.

Figure 2:
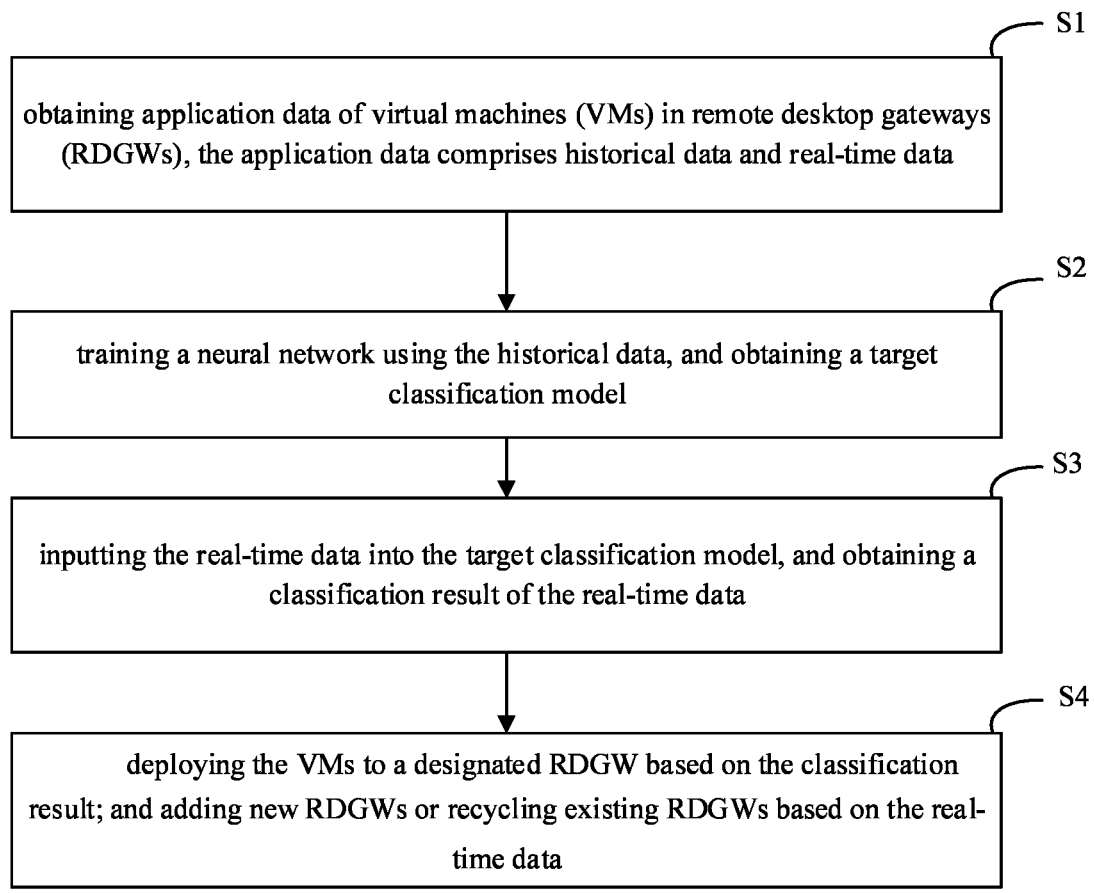
FIG. 2 is a flowchart diagram of a method for deploying remote desktop gateways in an embodiment of the present application.

FIG. 2 is a flowchart diagram of a method for deploying remote desktop gateways in an embodiment of the present application.

Figure 4:
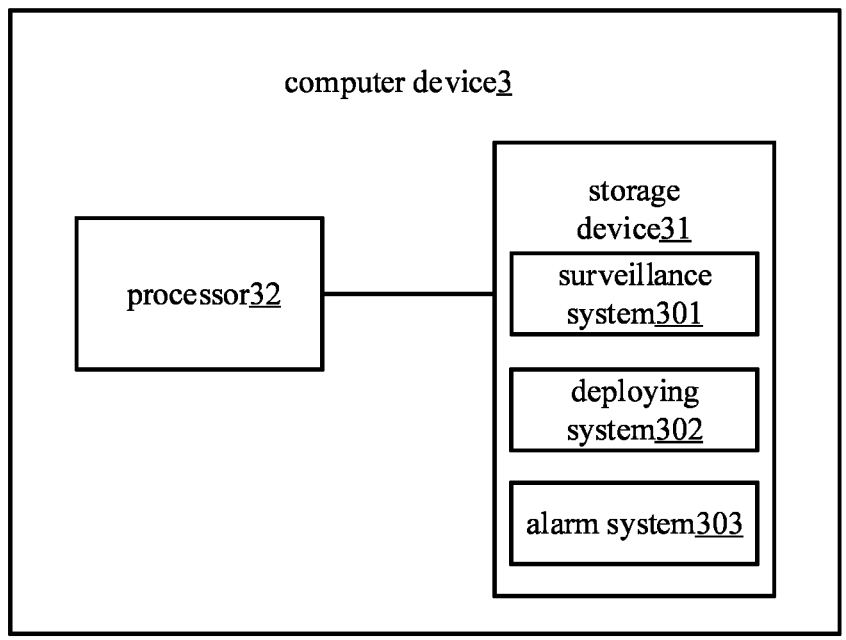
FIG. 4 is a structural diagram of a computer device for deploying remote desktop gateways in an embodiment of the present application.

In one embodiment, the method may be applied to one or more computer devices 3 (shown in FIG. 4). The computer device 3 includes hardware, such as, but not limited to, a microprocessor and an Application Specific Integrated Circuit (ASIC), a Field-Programmable Gate Array (FPGA), a Digital Signal Processor (DSP), and embedded devices.

The computer device 3 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The computer device 3 may also include a network device and/or a user device. The network device includes, but is not limited to, a single network server, a server group including a plurality of network servers, or a cloud including a large number of hosts or network servers based on a cloud computing technology.

A network can include, but is not limited to, communication media such as the Internet, a wide area network, a metropolitan area network, a local area network, and a virtual private network (VPN), for example.

In block S1, a surveillance system 301 obtains application data of virtual machines (VMs) in remote desktop gateways (RDGWs), the application data includes historical data and real-time data.

In one embodiment, each of the RDGWs has its own serial number, so different RDGWs have different serial numbers, for example, RDGW1, RDGW2, etc. Each of the VMs has its own serial number, so different VMs have different serial numbers, for example, VM1, VM2, etc.

When a user logs on the VM, the user can use one or more VMs through the RDGWs. For example, as shown in FIG. 1, one VM is deployed to one RDGW, and one RDGW may correspond to a preset number of VMs, for example, fifty VMs.

Figure 3:
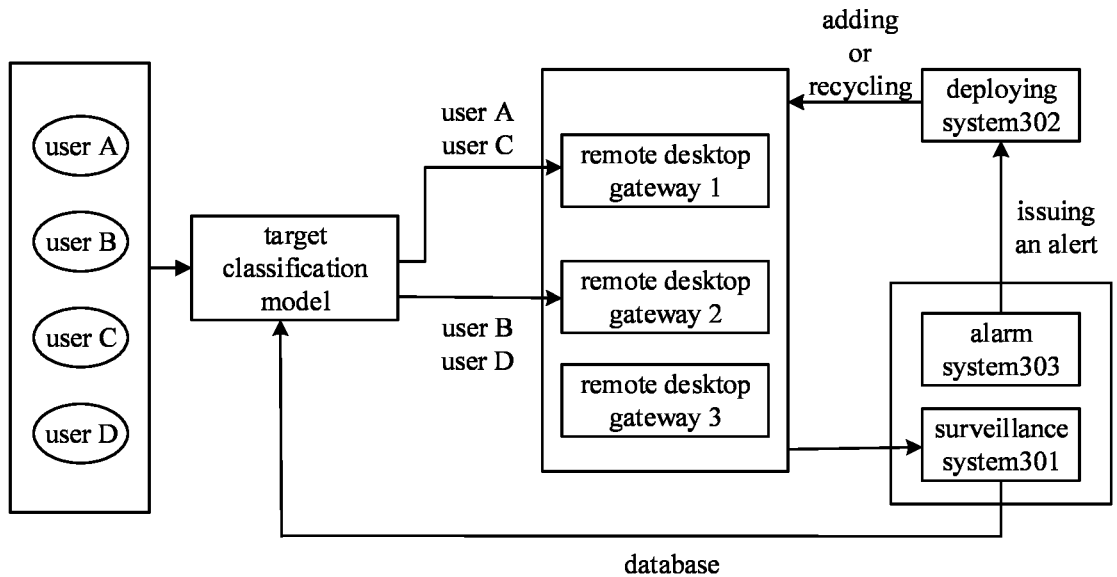
FIG. 3 is a diagram of the method for deploying remote desktop gateways of FIG. 2.

Referring to FIG. 3, which is a diagram of the method for deploying remote desktop gateways in an embodiment of the present application. As shown in FIG. 3, each of the users has an identity number (ID), so different users have different identity numbers (IDs), for example, user A, user B, and so on.

In one embodiment, the surveillance system 301 monitors the VMs and obtains the application data. The application data is stored in a preset database constructed in a storage device. The historical data includes the IDs of users that logged on the VMs, logon time b10 when the users logged on the VMs, and logout time e10 when the users logged out of the VMs. The real-time data includes usage state of the VMs, the usage state of the VMs includes an unused state, a logon state, and an accessing state in which a logging-in operation is being performed. The unused state indicates that a VM has not been logged on by any user and no logon operation is performing on the VM. The logon state indicates a state when a user has successfully logged in and a VM is in use. For example, the user has performed a logging-in operation on the VM, and successfully logged in to use the VM, thus the state is determined to be logged-in. When an ID and a password input by the user are determined to be valid, it is determined that the user has successfully logged in. The accessing state indicates a state of a VM during which the user is performing a login operation and has not yet successfully logged in. For example, the user is trying to access the VM by inputting an ID and/or a password, and before the user is able to achieve log-in to the VM successfully, the VM is in the accessing state. In response that the usage state of the VMs is the logon state or the accessing state, the real-time data further includes the IDs, and accessing time b2 when the users are performing logging-in operation on the VMs.

In one embodiment, the historical data includes usage data of the VM when used by the users during working time on historical working days. Data in historical non-working days (for example, weekends, holidays, etc.) is not recorded in the historical data because of not being representative.

In block S2, the computer device 3 trains a neural network using the historical data, and obtains a target classification model.

In one embodiment, the historical data is obtained from the preset database as training samples. The neural network is trained using the training samples and a classification model is obtained. The classification model is updated iteratively for at least one time until the classification model meets preset requirements, and the classification model that meets the preset requirements is determined to be the target classification model.

In one embodiment, the computer device 3 determines whether the classification model after an iterative update meets the preset requirements. In response that a classification model after the iterative update meets the preset requirements, the computer device 3 determines the classification model to be the target classification model. In response that the classification model after the iterative update does not meet the preset requirements, the computer device 3 trains the classification model using updated historical data obtained from the preset database, the computer device 3 obtains an updated classification model, and the computer device 3 continues training the updated classification model in a next iteration update.

In one embodiment, the preset requirements include a preset number of time periods, each of the preset number of time periods may include a preset time length, and the preset number may refer to a number obtained by dividing the working time according to the preset time length. For example, the working time from 9:00 to 18:00 is divided into a time period every twenty minutes, and twenty-seven time periods are obtained, for example, a time period 17:00 to 17:20 and so on.

In one embodiment, an ID of a user logging in a VM and time b10 when logging in the VM in the historical data are inputted into the classification model after the iterative update, and predicted time e20 when the user will be logging out of the VM is obtained. The computer device 3 compares the predicted time e20 with logout time e10 when the any user logs out of the VM in the historical data, the logout time e10 indicates actual time when the any user logs out of the VM. The computer device 3 determines whether the predicted time e20 and the logout time e10 are within a same time period in the preset number of time periods, and a determination result is obtained. In response that the determination result indicates that the predicted time e20 and the logout time e10 are within the same time period, the classification model after the iterative update is determined to meet the preset requirements. In response that the determination result indicates that the predicted time e20 and the logout time e10 are not within the same time period, the classification model after the iterative update does not meet the preset requirements.

In block S3, the surveillance system 301 inputs the real-time data into the target classification model, and obtains a classification result of the real-time data.

In one embodiment, the real-time data is inputted into the target classification model. In response that the real-time data indicates that the usage state of the VMs is the accessing state, the IDs and the accessing time b2 are inputted into the target classification model. Logout time e2 when the users will log out of the VMs using the target classification model.

The logout time e2 is compared with each time period of the preset number of time periods, and the IDs of the users corresponding to the logout time e2 in a same time period are classified into one category, and the preset number of classification results is obtained.

For example, user A performs a login operation on VM1 through RDGW1 at 13:16, predicted logout time when the user A will log out of the VM1 is determined to be 17:05 by using the target classification model. User C performs a login operation on VM2 through RDGW2 at 14:27, predicted logout time when the user C will log out of the VM2 is determined to be 17:15 using the target classification model. Both the user A and the user C are predicted to log out within the time period 17:00 to 17:20, and the user A and the user C are grouped together.

In block S4, a deploying system 302 deploys the VMs to a designated RDGW based on the classification result, and the deploying system 302 adds new RDGWs or recycles existing RDGWs based on the real-time data.

In one embodiment, the VMs on which a plurality of users belonging to a same category are performing a login operation are deployed to the designated RDGW. The designated RDGW may be an RDGW through which users belonging to the same category are logged-in and using that RDGW. For example, the user A is logged in and using the VM1 at 14:27 through the RDGW1, and the user C performs a login operation on VM2 at 14:27 through RDGW2. The user C and the user A are determined to belong to the same category, and the VM2 on which the user C is logged-in and performing operations is deployed to the RDGW1.

In one embodiment, an alarm system 303 can analyze the real-time data. The alarm system 303 determines whether an average memory usage of the existing RDGWs is exceeding a preset threshold, for example, the preset threshold can be 70%.

For example, the alarm system 303 determines that the average memory usage of the existing RDGWs within a preset evaluation period of 3 minutes for example is exceeding 70%, "existing RDGWs" include the RDGW1 and the RDGW2. An average memory usage of the RDGW1 within 3 minutes is 80%, an average memory usage of the RDGW2 within 3 minutes is 70%, then the average memory usage of the existing RDGWs is exceeding the preset threshold of 70%.

In one embodiment, in response that the average memory usage of the existing RDGWs is exceeding the preset threshold, an alert is issued to the deploying system 302, and one or more new RDGWs are added.

In one embodiment, the alarm system 303 determines whether the VMs in the existing RDGWs are in the unused state. In response that the VMs in any of the existing RDGWs are in the unused state, a recycling warning is issued to the deploying system 302, and any one or more of the existing RDGWs is recycled.

For example, in response that the average memory usage of the existing RDGW is determined to exceed 70%, the alert is issued and a new RDGW is added. All users in the RDGW1 have logged out of the VM at 17:20, and the RDGW1 is recycled.

FIG. 4 is a structural diagram of a computer device for deploying remote desktop gateways in an embodiment of the present application.

The computer device 3 may include a storage device 31 and at least one processor 32. The storage device 31 may include a surveillance system 301, a deploying system 302, and an alarm system 303. Computer-readable instructions are stored in the storage device 31 and executable by the at least one processor 32.

Those skilled in the art will understand that FIG. 4 is only an example of the computer device 3 and does not constitute a limitation on the computer device 3. Another example of computer device 3 may include more or fewer components than shown in the figures or may combine some components or have different components. For example, the computer device 3 may further include an input/output device, a network access device, a bus, and the like.

The at least one processor 32 can be a central processing unit (CPU), or can be another general-purpose processor, digital signal processor (DSPs), application-specific integrated circuit (ASIC), Field-Programmable Gate Array (FPGA), other programmable logic device, discrete gate, transistor logic device, or discrete hardware component, etc. The processor 32 can be a microprocessor or any conventional processor. The processor 32 is a control center of the computer device 3 and connects various parts of the entire computer device 3 by using various interfaces and lines.

The processor 32 executes the computer-readable instructions to implement the method in the embodiments described above, such as in blocks S1-S4 shown in FIG. 2. Alternatively, the processor 32 executes the computer-readable instructions to implement the functions of the modules/units in the foregoing device embodiments, such as the modules 301-302 in FIG. 4.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the computer device 3. For example, the computer-readable instructions can be divided into the surveillance system 301, the deploying system 302, and the alarm system 303 as shown in FIG. 4.

The storage device 31 can be configured to store the computer-readable instructions and/or modules/units. The processor 32 may run or execute the computer-readable instructions and/or modules/units stored in the storage device 31 and may call up data stored in the storage device 31 to implement various functions of the computer device 3. The storage device 31 mainly includes a storage program area and a storage data area. The storage program area may store an operating system, and an application program required for at least one function (such as a sound playback function, an image playback function, for example), for example. The storage data area may store data (such as audio data, phone book data, for example) created during the use of the computer device 3. In addition, the storage device 31 may include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the computer device 3. The storage device 31 may be a memory in a physical form, such as a memory stick, a Trans-flash Card (TF card), for example.

When the modules/units integrated into the computer device 3 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity capable of non-transitorily storing the computer readable instruction code, such as an U disk, a mobile hard disk, a magnetic disk, an optical disk, a computer memory, or a read-only memory (ROM).

With reference to FIG. 2, the storage device 31 in the computer device 3 stores a plurality of instructions to implement a deployment method of remote desktop gateways, and the processor 32 can execute the multiple instructions to: obtain application data of virtual machines (VMs) in remote desktop gateways (RDGWs), the application data comprises historical data and real-time data; train a neural network using the historical data, and obtain a target classification model; input the real-time data into the target classification model, and obtain a classification result of the real-time data; deploy the VMs to a designated RDGW based on the classification result; and add new RDGWs or recycling existing RDGWs based on the real-time data.

The computer-readable instructions are executed by the processor 32 to perform the functions of each module/unit in the above-mentioned device embodiments, which will not be repeated here.

In the several embodiments provided in the preset application, the disclosed computer device and method can be implemented in other ways. For example, the embodiments of the devices described above are merely illustrative. For example, divisions of the modules are based on logical function only, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method of deploying remote desktop gateways, the method comprising:
obtaining application data of virtual machines (VMs) in remote desktop gateways (RDGWs), the application data comprises historical data and real-time data;
training a neural network using the historical data, and obtaining a target classification model, comprising: obtaining a classification model; inputting an identity number (ID) of a user logging in a VM and time "b10" when logging in the VM in the historical data into the classification model, and obtaining a predicted time "e20" when the user will log out of the VM; comparing the predicted time "e20" with logout time "e10" when any user logs out of the VM in the historical data, the logout time "e10" indicating actual time when the any user logs out of the VM; determining whether the predicted time "e20" and the logout time "e10" are within a same time period among a preset number of time periods, and obtaining a determination result; in response that the determination result indicates that the predicted time "e20" and the logout time "e10" are within the same time period, determining the classification model to be the target classification model, each of the preset number of time periods comprising a preset time length, and the preset number referring to a number obtained by dividing working time according to the preset time length;
inputting the real-time data into the target classification model, and obtaining a classification result of the real-time data;
deploying the VMs to a designated RDGW based on the classification result; and
adding new RDGWs or recycling existing RDGWs based on the real-time data.

2. The method of claim 1, further comprising:
monitoring the VMs and obtaining the application data; and
storing the application data in a preset database.

3. The method of claim 2, further comprising:
obtaining the historical data from the preset database as training samples, training the neural network using the training samples, and obtaining a classification model; and
updating the classification model iteratively for at least one time until the classification model meets preset requirements, and determining the classification model that meets the preset requirements to be the target classification model.

4. The method of claim 3, wherein updating the classification model iteratively for at least one time comprises:
determining whether the classification model after an iterative update meets the preset requirements;
in response that the classification model after the iterative update meets the preset requirements, determining the classification model to be the target classification model;
in response that the classification model after the iterative update does not meet the preset requirements, training the classification model using updated historical data obtained from the preset database, obtaining an updated classification model, and continuing training the updated classification model in a next iteration update.

5. The method of claim 1, wherein the historical data comprises identity numbers (IDs) of users that logged on the VMs, logon time when the users logged on the VMs, and logout time "e10" when the users logged out of the VMs;
the real-time data comprises usage state of the VMs, the usage state of the VMs comprises an unused state, a logon state, and an accessing state in which a logging-in operation is being performed;
in response that the usage state of the VMs is the logon state or the accessing state, the real-time data further comprises the IDs, and accessing time "b2" when the users are performing logging-in operations on the VMs.

6. The method of claim 5, wherein inputting the real-time data into the target classification model, and obtaining the classification result of the real-time data comprises:
in response that the real-time data indicates that the VMs is in the accessing state, inputting the IDs of the users performing the login operations on the VMs and the accessing time "b2" into the target classification model;
predicting logout time "e2" of the users using the target classification model;
determining a corresponding time period for each of the users by comparing the logout time "e2" with a range of each time period among the preset number of time periods, classifying IDs of users corresponding to a same time period into one category, and obtaining a preset number of classification results.

7. The method of claim 6, wherein deploying the VMs to the designated RDGW based on the classification result comprises:
determining VMs on which users belonging to a same category are performing a logon operation, deploying the determined VMs to the designated RDGW.

8. The method of claim 5, wherein adding new RDGWs or recycling existing RDGWs based on the real-time data comprises:
analyzing the real-time data;
issuing an alert and adding one or more new RDGWs in response that an average memory usage of the existing RDGWs is exceeding a preset threshold; or
issuing a recycling warning and recycling any one or more of the existing RDGWs, in response that the usage state of the VMs in any of the existing RDGWs is the unused state.

9. A computer device comprising:
a processor; and
a storage device storing a plurality of instructions, which when executed by the processor, cause the processor to:
obtain application data of virtual machines (VMs) in remote desktop gateways (RDGWs), the application data comprises historical data and real-time data;
train a neural network using the historical data, and obtain a target classification model, comprising: obtain a classification model; input an identity number (ID) of a user logging in a VM and time "b10" when logging in the VM in the historical data into the classification model, and obtain a predicted time "e20" when the user will log out of the VM; compare the predicted time "e20" with logout time "e10" when any user logs out of the VM in the historical data, the logout time "e10" indicating actual time when the any user logs out of the VM; determine whether the predicted time "e20" and the logout time "e10" are within a same time period among a preset number of time periods, and obtain a determination result; in response that the determination result indicates that the predicted time "e20" and the logout time "e10" are within the same time period, determine the classification model to be the target classification model, each of the preset number of time periods comprising a preset time length, and the preset number referring to a number obtained by dividing working time according to the preset time length;

input the real-time data into the target classification model, and obtain a classification result of the real-time data;

deploy the VMs to a designated RDGW based on the classification result; and add new RDGWs or recycling existing RDGWs based on the real-time data.

10. The computer device of claim 9, wherein the processor is further caused to:

monitor the VMs and obtain the application data; and store the application data in a preset database.

11. The computer device of claim 10, wherein the processor is further caused to:

obtain the historical data from the preset database as training samples, train the neural network using the training samples, and obtain a classification model; and update the classification model iteratively for at least one time until the classification model meets preset requirements, and determine the classification model that meets the preset requirements to be the target classification model.

12. The computer device of claim 11, wherein the processor is further caused to:

determine whether the classification model after an iterative update meets the preset requirements;

in response that the classification model after the iterative update meets the preset requirements, determine the classification model to be the target classification model;

in response that the classification model after the iterative update does not meet the preset requirements, train the classification model using updated historical data obtained from the preset database, obtain an updated classification model, and continuing train the updated classification model in a next iteration update.

13. The computer device of claim 9, wherein the historical data comprises identity numbers (IDs) of users that logged on the VMs, logon time when the users logged on the VMs, and logout time "e10" when the users logged out of the VMs;

the real-time data comprises usage state of the VMs, the usage state of the VMs comprises an unused state, a logon state, and an accessing state in which a logging-in operation is being performed;

in response that the usage state of the VMs is the logon state or the accessing state, the real-time data further comprises the IDs, and accessing time "b2" when the users are performing logging-in operation on the VMs.

14. The computer device of claim 13, wherein the processor is further caused to:

in response that the real-time data indicates that the VMs is in the accessing state, input the IDs of the users performing the login operations on the VMs and the accessing time "b2" into the target classification model;

predict logout time "e2" of the users using the target classification model;

determine a corresponding time period for each of the users by comparing the logout time "e2" with a range of each time period among the preset number of time periods, classify IDs of users corresponding to a same time period into one category, and obtain a preset number of classification results.

15. A non-transitory storage medium having stored thereon at least one computer-readable instructions that, when executed by a processor of a computer device, causes the computer device to perform a method for deploying remote desktop gateways, the method comprising:

obtaining application data of virtual machines (VMs) in remote desktop gateways (RDGWs), the application data comprises historical data and real-time data;

training a neural network using the historical data, and obtaining a target classification model, comprising: obtaining a classification model; inputting an identity number (ID) of a user logging in a VM and time "b10" when logging in the VM in the historical data into the classification model, and obtaining a predicted time "e20" when the user will log out of the VM; comparing the predicted time "e20" with logout time "e10" when any user logs out of the VM in the historical data, the logout time "e10" indicating actual time when the any user logs out of the VM; determining whether the predicted time "e20" and the logout time "e10" are within the same time period among a preset number of time periods, and obtaining a determination result; in response that the determination result indicates that the predicted time "e20" and the logout time "e10" are within a same time period, determining the classification model to be the target classification model, each of the preset number of time periods comprising a preset time length, and the preset number referring to a number obtained by dividing working time according to the preset time length;

inputting the real-time data into the target classification model, and obtaining a classification result of the real-time data;

deploying the VMs to a designated RDGW based on the classification result; and adding new RDGWs or recycling existing RDGWs based on the real-time data.

16. The non-transitory storage medium of claim 15, wherein the method further comprises:

monitoring the VMs and obtaining the application data; and storing the application data in a preset database.

17. The non-transitory storage medium of claim 16, wherein the method further comprises:

obtaining the historical data from the preset database as training samples, training the neural network using the training samples, and obtaining a classification model; and updating the classification model iteratively for at least one time until the classification model meets preset requirements, and determining the classification model that meets the preset requirements to be the target classification model.

18. The non-transitory storage medium of claim 17, wherein updating the classification model iteratively for at least one time comprises:

determining whether the classification model after an iterative update meets the preset requirements;

in response that the classification model after the iterative update meets the preset requirements, determining the classification model to be the target classification model;

in response that the classification model after the iterative update does not meet the preset requirements, training the classification model using updated historical data obtained from the preset database, obtaining an updated classification model, and continuing training the updated classification model in a next iteration update.

19. The non-transitory storage medium of claim 15, wherein the historical data comprises identity numbers (IDs) of users that logged on the VMs, logon time when the users logged on the VMs, and logout time "e10" when the users logged out of the VMs;
   the real-time data comprises usage state of the VMs, the usage state of the VMs comprises an unused state, a logon state, and an accessing state in which a logging-in operation is being performed;
   in response that the usage state of the VMs is the logon state or the accessing state, the real-time data further comprises the IDs, and accessing time "b2" when the users are performing logging-in operation on the VMs.

20. The non-transitory storage medium of claim 19, wherein inputting the real-time data into the target classification model, and obtaining the classification result of the real-time data comprises:
   in response that the real-time data indicates that the VMs is in the accessing state, inputting the IDs of the users performing the login operations on the VMs and the accessing time "b2" into the target classification model;
   predicting logout time "e2" of the users using the target classification model;
   determining a corresponding time period for each of the users by comparing the logout time "e2" with a range of each time period among the preset number of time periods, classifying IDs of users corresponding to a same time period into one category, and obtaining a preset number of classification results.

* * * * *